United States Patent [19]

Tsilibes

[11] Patent Number: 4,707,709
[45] Date of Patent: Nov. 17, 1987

[54] IMAGE RECORDING APPARATUS IN WHICH EXPOSURE LEVELS ARE A FUNCTION OF IMAGE CONTENTS

[75] Inventor: George N. Tsilibes, Rochester, N.Y.

[73] Assignee: Eastman Kodak Company, Rochester, N.Y.

[21] Appl. No.: 819,580

[22] Filed: Jan. 17, 1986

[51] Int. Cl.$^4$ .................. G01D 9/42; G03G 15/00
[52] U.S. Cl. ................. 346/108; 355/14 E; 358/310
[58] Field of Search ............ 346/108, 76 L, 160, 346/107 R; 219/121 LB; 358/298, 310; 355/14 E

[56] References Cited

U.S. PATENT DOCUMENTS

| | | | |
|---|---|---|---|
| 3,911,420 | 10/1975 | Lampson | 340/324 |
| 4,004,079 | 1/1977 | Boston | 358/256 |
| 4,194,221 | 3/1980 | Stoffel | 358/283 |
| 4,296,423 | 10/1981 | Nakamura | 346/160 |
| 4,319,285 | 3/1982 | Minerd | 358/300 |
| 4,387,983 | 6/1983 | Masegi | 355/8 |
| 4,627,712 | 12/1986 | Usami | 355/14 |

Primary Examiner—E. A. Goldberg
Assistant Examiner—Mark Reinhart
Attorney, Agent, or Firm—Donald D. Schaper

[57] ABSTRACT

Image recording apparatus is disclosed in which a laser beam is modulated in accordance with a digital input which includes character information as well as the type of font and the point size. The modulated beam is scanned onto a photoconductive belt to form a latent electrostatic image, and the image is developed by a xerographic process. In order to produce a high-quality print of subject matter which includes a variety of fonts and point sizes, each font is exposed at a preselected level which provides the optimum exposure for that particular font.

9 Claims, 5 Drawing Figures

IMAGE RECORDING APPARATUS IN WHICH EXPOSURE LEVELS ARE A FUNCTION OF IMAGE CONTENTS

BACKGROUND OF THE INVENTION

1. Field of the Invention

The present invention relates to image recording apparatus, and more particularly, to recording apparatus in which images are produced on a recording medium by a scanning light beam which is modulated in accordance with information signals.

2. State of the Prior Art

In recording apparatus known as scan printers, a beam of light is modulated in accordance with image information coming from an electronic computer or the like. The modulated beam is focused on a recording medium by optical elements and is moved across the medium by a scanning device.

In certain scan printers, the beam of light is produced by a laser, and an electrophotographic process is used to record the data. In such printers, the quality of alphanumeric prints depends, among other factors, on the proper exposure of the various fonts. For example, a font formed of lines of uniform thickness, such as a Helvetica font, retains its quality through a rather wide variation in exposure. On the other hand, the quality of a font which contains lines of non-uniform thickness, e.g., a script font, is only acceptable within a much narrower range of exposures. In practice, a typical printed page contains a large variety of fonts and point sizes, and it can also include line art and half-tones. All of these types of images require a specific exposure level in order to be printed in an optimum fashion. There is a problem in known image recording apparatus in that the exposure setting must be a compromise, since the exposure setting remains the same, within the stability limits of the scanning exposure source, for an entire document.

U.S. Pat. No. 4,387,983, is directed to the problem of "thinning of the image" in the printing of certain characters on a photosensitive medium. This patent discloses apparatus in which information is recorded by scanning a photosensitive medium with a beam of light regulated by a modulation signal. When a line segment to be printed is relatively narrow, the width of the modulation signal is enlarged to avoid undesirable thinning of the recorded image. The pulse duration of the modulation signal is changed only when it is shorter than a certain predetermined pulse duration. Such a system requires complex signal processing circuits to selectively change the width of the modulation signal, and there is no disclosure in this patent of a means of insuring the proper exposure for a given font.

SUMMARY OF THE INVENTION

It is an object of the present invention to overcome the problems in the prior art discussed above and to provide image recording apparatus in which the proper exposure is given to each font on a printed page.

In accordance with one aspect of the invention, there is provided image recording apparatus for recording information from a source onto a receiving medium, said information containing a series of images and a predetermined category for each image, said apparatus comprising: generating means coupled to said source and responsive to information therein for producing an electrical signal corresponding to said series of images; means for modulating said electrical signal to produce a modulation signal which reflects a preselected exposure value for the category of each image in said series; beam producing means for producing a beam of light modulated in accordance with said modulation signal; and beam directing means for locating said beam of light at selected locations on said medium.

In one embodiment of the invention, exposure information for a plurality of fonts is stored in a look-up table in a memory unit within the apparatus control unit. The exposure information for the particular font being formatted is fed through a digital-to-analog converter to control elements which effect the proper exposure for the font.

The present invention is particularly advantageous for use in printing documents in which a number of different fonts are included in the document. One application is in the printing of pages for use in proofing a publication, for example, a periodical. In such an application, precise information is contained in memory concerning the image content of a document. This information is used to vary the exposure in accordance with the type of image to optimize the print quality of the image.

Other features and advantages will become apparent from reference to the following description of the preferred embodiment when read in light of the attached drawings.

DESCRIPTION OF THE PREFERRED EMBODIMENT

Figure 1:
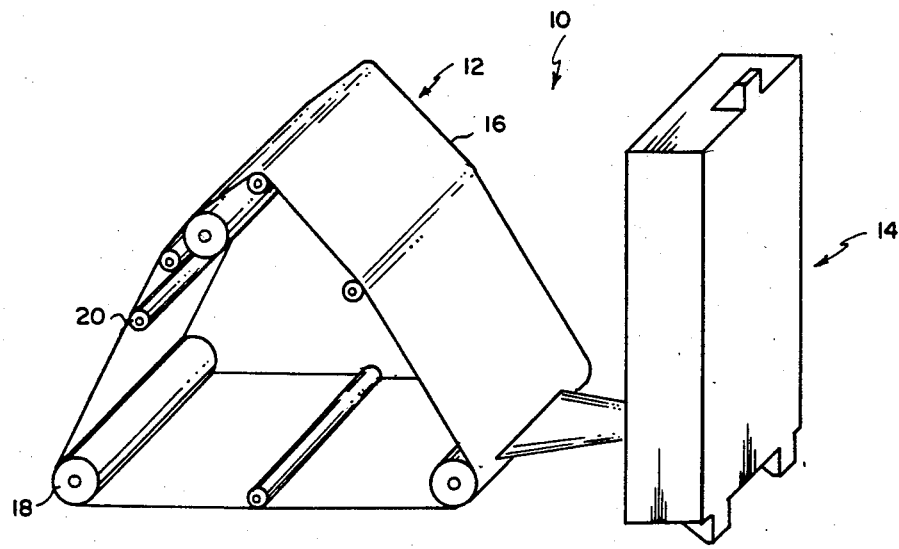
FIG. 1 is a perspective view of the image recording apparatus of the present invention.

With reference to FIG. 1, there is shown image recording apparatus 10 which comprises a photoreceptor 12 and a laser recording device 14. Photoreceptor 12 comprises a receiving medium in the form of a photoconductive belt 16 which is trained about guide rollers 20 and main rollers 18, one of which is connected to a drive motor (not shown). Belt 16 is adapted to have a latent electrostatic image formed thereon by recording device 14 in a manner to be described hereinafter. The latent electrostatic image is developed by known electrophotographic means, as described, for example, in U.S. Pat. No. 3,914,047, issued Oct. 21, 1975 to Hunt, Jr. et al, and this patent is expressly incorporated herein by reference.

Figure 2:
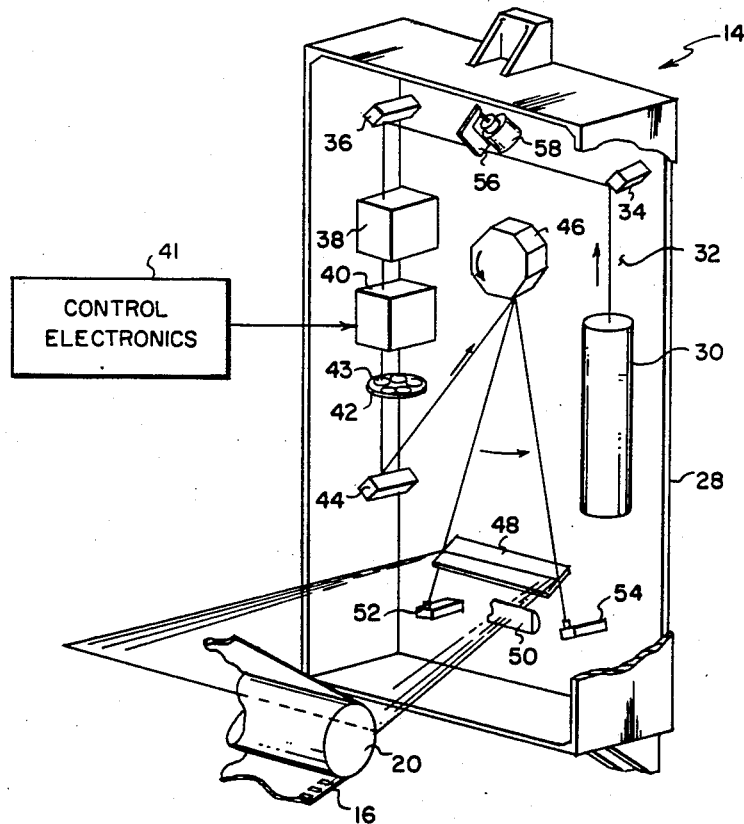
FIG. 2 is a perspective view of the laser recording device of the apparatus shown in FIG. 1.

As shown in FIG. 2, laser recording device 14 comprises a housing 28 having mounted thereon a beam producing means in the form of a laser 30 which can be, for example, a nominal 7 mw neon-helium laser. Laser 30 produces a beam, indicated by line 32, which is directed by mirrors 34 and 36 and collimating optics 38 to an acousto-optic modulator 40.

Modulator 40 is controlled by signals from control electronics 41 which will be described in detail in the discussion that follows. The modulated beam from acousto-optic modulator 40 passes through a rotatable filter wheel 42 containing a plurality of neutral density filters 43, and is then directed by a mirror 44 to a rotatable polygon 46. Polygon 46 serves as a beam directing means to locate the beam at selected locations on belt 16 in a cross-track direction, and belt 16 is driven at a regulated speed to provide the in-track direction of scan. Polygon 46 is rotated by an AC synchronous motor 45 (FIG. 3) to scan the beam across an exit mirror 48 which directs the beam through an exit lens 50 and onto belt 16. A start-of-scan (SOS) sensor 52 picks the beam up at the start of a new line, and an end-of-scan (EOS) sensor 54 detects the completion of a line. A shutter 56, controlled by a solenoid 58, is actuated at the start of a printing cycle.

Figure 3:
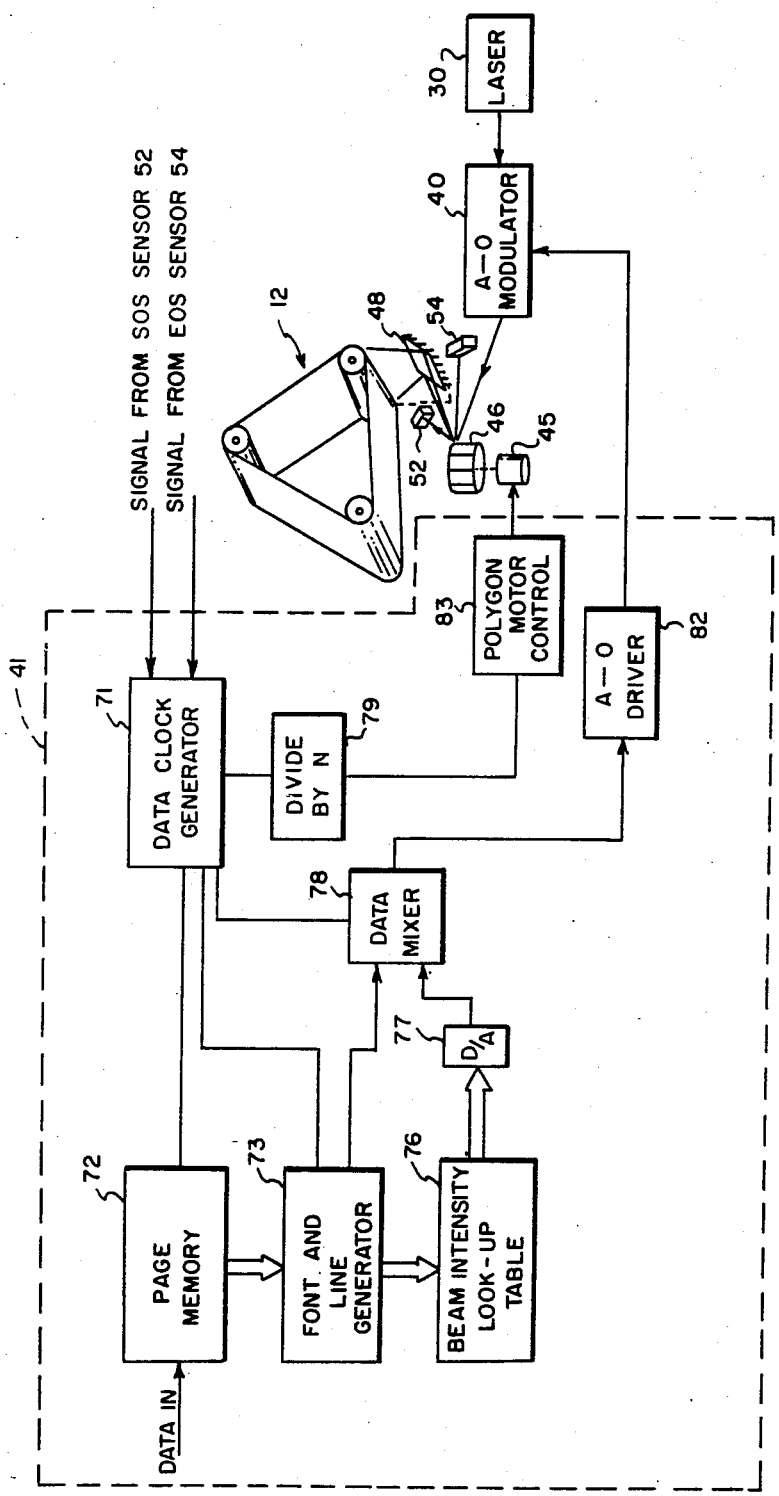
FIG. 3 is a block diagram showing the control electronics for the laser recording device and the operative relationship of the control electronics to certain elements of the recording apparatus.

With reference to FIG. 3, a block diagram of the control electronics 41 is shown in conjunction with certain elements of the recording apparatus 10. Data in digital form is supplied to a page memory 72. The source of the digital data (not shown) can be a magnetic tape, a magnetic disk file or an equivalent device.

The digital information is usually encoded in a standard code such as ASCII. Before a particular character, for example, an "E", is printed, the character must be augmented with at least another eight bits which denote point size and type of font under which the letter "E" must be printed. The 16 bit word describing the letter "E" is received and stored in page memory 72. Signals from a data clock generator 71 serve to effect the unloading of data from memory 72, a line at a time, to a font and line generator 73. The data for a line of print are stored in a buffer storage in generator 73 and are decoded to provide the binary signals needed to produce a line of print characters in the desired font and point types. A fixed number of line scans are necessary to produce a line of print characters, and generator 73 functions in a conventional manner to produce a binary signal representative of the exposed and non-exposed pixels for each scan line in the line of print.

When the 16 bit word corresponding to a character is decoded in generator 73, the information relating to its font and point size is passed on to a beam intensity look up table 76. Table 76 is stored in a non-volatile memory and contains previously determined data that relate the optimum beam exposure to a specific font such as Helvetica or script. The signal from table 76 is passed through a digital-to-analog converter 77, and an analog signal for each character is generated and fed into a data mixer 78.

The data mixer 78 combines the analog signal from the digital-to-analog converter 77 with the binary data stream from generator 73. The main function of data mixer 78 is to adjust the voltage level of the binary data. Without analog input, the binary data stream varies between 0 and a nominal voltage level of +5 volts. When an analog input is supplied to the data mixer 78, it shifts the maximum level to a value, lower than +5 volts, which depends on the desired exposure level. As will be apparent from the discussion which follows, the lower the maximum level, the greater the beam intensity which issues from modulator 40.

An acousto-optic drive 82 receives the amplitude adjusted binary signal from data mixer 78. Driver 82 includes means for applying a high frequency signal to the acousto-optic modulator 40, the high frequency signal being frequency modulated in accordance with the binary information in the signal from data mixer 78 and amplitude modulated in accordance with the adjusted maximum level of the signal from data mixer 78. As is well known, driver 82 can include an R/F generator (not shown) and a power amplifier (not shown) which scales the amplitude of the R/F signal.

Acousto-optic modulator 40 comprises a transparent cell (not shown) formed, for example, from glass or $TeO_2$ crystal, and a piezoelectric transducer (not shown) bonded to it. When the high frequency signal is applied to the piezoelectric transducer, ultrasonic waves are produced in the cell of modulator 40 which result in periodic variations of the index of refraction of the material. The cell in modulator 40, in effect, acts as a difraction grating when the light beam from the laser 30 impinges on it; both the intensity and the direction of the light beam are controlled by the acousto-optic modulator 40. When the amplitude of the high frequency signal is modulated, the efficiency of the grating is changed in such a way as to affect the intensity of the impinging beam. When the frequency of the high frequency wave is changed, the path of the grating is changed thus affecting the direction that the beam takes through the crystal. In this particular embodiment, the so-called zero order beam is blocked, and the first order beam is allowed to propagate through and eventually expose the photoreceptor 12.

When the maximum voltage level of the binary signal is shifted down by data mixer 78, the changed input to driver 82 produces an amplitude modulation of the high frequency wave in the modulator 40. This change results in a beam power increase which is a function of the input voltage level.

A data clock generator 71 provides the overall system timing. A clock signal is derived from a stable high frequency crystal oscillator (not shown). Clock pulses from the data clock generator 71 are gated out by a pulse from start-of-scan (SOS) sensor 52, and the clock pulses are equal to the number of pixels that the system is capable of printing per line, e.g., 300 pixels/inch of the scan line. The pixel clock pulses are extinguished when the pulse from the end-of-scan (EOS) sensor 54 is received. These events determine the scan line time, and signals are provided at the appropriate points to generator 73 to start a new line of print and to memory 72 to unload character data into generator 73. The pixel clock pulse is also fed to the data mixer 78 to effect the correct temporal mixing of the binary and analog signals. A fourth timing signal is passed through a divide-by-N counter 79 to a polygon motor control 83.

Figure 4:
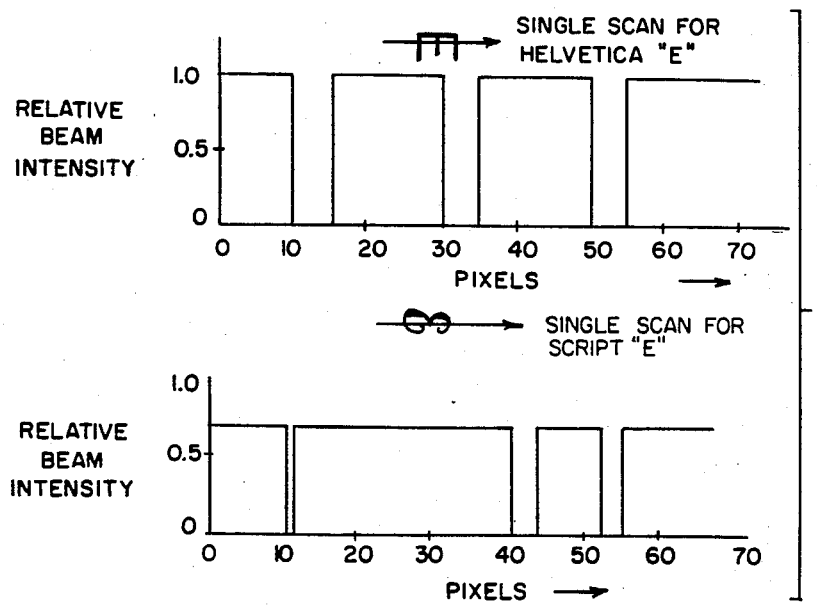
FIG. 4 is a diagram showing beam intensity profiles for two different types of fonts.

In the preferred embodiment of the invention, the laser is turned on to discharge areas on belt 16 where no printing is desired. With reference to FIG. 4, there are shown beam intensity profiles for the letter "E" printed in Helvetica and script fonts respectively. It will be seen that all the lines forming the Helvetica letter "E" are formed by the same number of non-exposed pixels and at a higher relative beam intensity of the exposing source, in this case a laser beam, than the beam intensity used for exposing the script letter "E". Further, the vertical lines of the Helvetica "E" (FIG. 4) are all orthogonal to the horizontal line; thus, when a Helvetica "E" is printed the beam overlap does not result in "staircasing," a well-known phenomenon inherent in scanning systems in which non-orthogonal lines tend to be thinner and more ragged than orthogonal lines. The worst case for "staircasing" is a line printed at an angle of 45° to the horizontal.

It will be noted that the single scan line for the script letter "E" (FIG. 4) is produced in a distinctly different manner from the scan line for the Helvetica "E"; the first leg of the letter is formed by non-exposure of one pixel, the second leg by non-exposure of three pixels, and the third leg by non-exposure of two pixels. Additionally, and in contrast to the Helvetica "E", the lines forming the script "E" are not orthogonal and thus are prone to suffer from "staircasing." A reduction of the relative beam intensity to about 0.7 for the script "E" will considerably improve the print density of single pixel lines and will reduce the effects of "staircasing" of non-orthogonal lines. As a result of the reduced beam intensity, the remaining voltage on belt 16 after exposure is higher which results in a greater total negative charge for each non-exposed pixel; thus, when the latent image of the script "E" is developed, it is of higher density and improved overall quality.

As noted above, the intensity of the beam issuing from modulator 40 can be regulated by controlling the voltage input to driver 82. However, the intensity of the beam can be controlled over a wider range of values by using the voltage input to driver 82 in combination with filter wheel 42.

Figure 5:
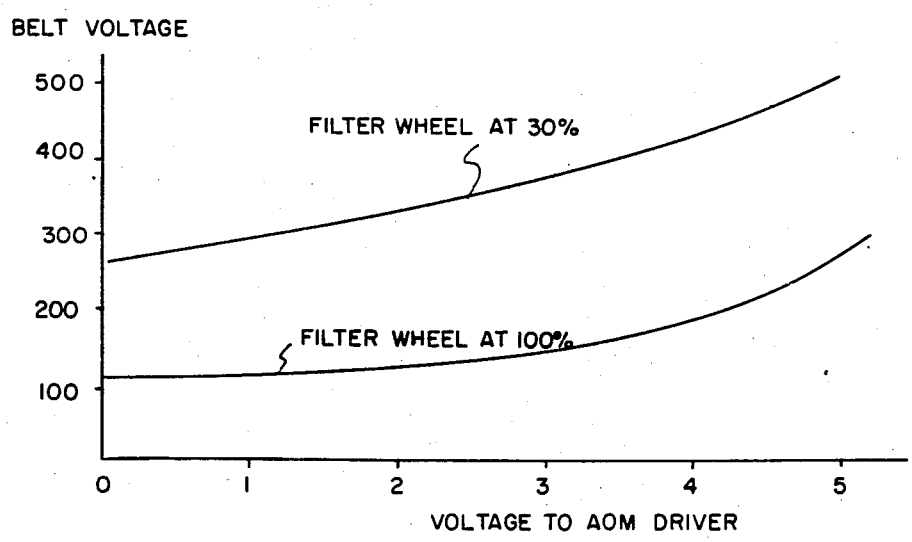
FIG. 5 is a graph showing photoconductive belt voltage plotted against voltage to the driver for the acousto-optic modulator at two different filter wheel settings.

In FIG. 5, there is shown a plot of voltage remaining on photoconductive belt 16 after exposure versus voltage to driver 82 for two different settings of filter wheel 42, i.e., two different filters 43; the initial charge on belt 16 was −600 volts. In the described apparatus, development will occur when the voltage remaining on belt 16 has a greater negative value than −200 volts. Thus, at a 30% setting of filter wheel 42 and 0 volts on driver 82, the remaining voltage on belt 16 of −260 will result in development. On the other hand, with the filter wheel 42 at a 100% setting, that is, no filter 43 in the optical path, a voltage on belt 16 of −120 volts is possible at 0 volts on driver 82; under this condition, no development can be expected. With the filter wheel 42 at 100%, a voltage on driver 82 in the range of 0 to +4 volts still will not result in development. It will be seen that a number of settings of filter wheel 42, such as 70% or 80%, and appropriate voltages on driver 82 can be used to achieve a desired exposure level.

The foregoing discussion has dealt primarily with the printing of different fonts. It will be apparent, however, that other images can also be processed according to the present invention. Thus, for example, line art classified in predetermined categories, e.g., each category corresponding to an elemental shape, can be processed at optimum exposure values using the disclosed invention.

The invention has been described in detail with particular reference to a preferred embodiment thereof, but it will be understood that variations and modifications can be effected within the spirit and scope of the invention.

What is claimed is:

1. Image recording apparatus for recording information from a source onto a receiving medium, said information containing a series of images and a predetermined category for each image, said apparatus comprising:
    generating means coupled to said source and responsive to information therein for producing an electrical signal corresponding to said series of images;
    means for modulating said electrical signal to produce a modulation signal which reflects a preselected exposure value for the category of each image in said series;
    beam producing means for producing a beam of light modulated in accordance with said modulation signal; and
    beam directing means for locating said beam of light at selected locations on said medium.

2. The image recording apparatus of claim 1 wherein said modulation means includes means for storing an exposure value for each of said categories.

3. The image recording apparatus of claim 1 wherein said beam producing means comprises means for generating a laser beam and means for modulating the laser beam.

4. The image recording apparatus of claim 3 wherein said means for modulating the laser beam comprises an acousto-optic modulator and filter means for optically attenuating said beam.

5. The image recording apparatus of claim 1 wherein said receiving medium is a movable photoconductor.

6. Image recording apparatus for recording information from a source onto a receiving medium, said information containing a series of characters and a type of font for each character, said apparatus comprising:
    generating means coupled to said source and responsive to information therein for producing an electrical signal corresponding to said series of characters;
    means for modulating said electrical signal to produce a modulation signal which reflects a preselected exposure value for the type of font of each character in said series;
    beam producing means for producing a beam of light modulated in accordance with said modulation signal; and
    beam directing means for locating said beam of light at selected locations on said medium.

7. The image recording apparatus of claim 6 wherein said modulation means includes means for storing an exposure value for each of said types of fonts.

8. The image recording apparatus of claim 6 wherein said beam producing means includes means for changing the intensity of the light beam in response to said modulation signal.

9. Image recording apparatus for recording a print character having a selected type of font onto a receiving medium, said apparatus comprising:
    means for exposing said medium with a beam of light at selected points to produce an image of said character, said exposing means including means for producing a beam movable relative to said medium and modulator means operable in response to a high frequency signal to control the direction of said beam in accordance with the frequency of the signal and the intensity of the beam in accordance with the amplitude of the signal;
    generating means for producing a binary signal representative of said character;
    intensity control means for adjusting a maximum value of said binary signal in accordance with said type of font to produce a modulation signal; and
    driver means for receiving said modulation signal and for producing said high frequency signal wherein the frequency thereof is modulated in accordance with binary information in said modulation signal and the amplitude thereof is modulated in accordance with said maximum value.

* * * * *

UNITED STATES PATENT AND TRADEMARK OFFICE
CERTIFICATE OF CORRECTION

PATENT NO. : 4,707,709

DATED : November 17, 1987

INVENTOR(S) : George N. Tsilibes

It is certified that error appears in the above-identified patent and that said Letters Patent are hereby corrected as shown below:

Title page, [54], line 3, last word of title, "CONTENTS" should read --CONTENT--.

Column 1, line 3, last word of title, "CONTENTS" should read --CONTENT--.

Column 3, line 27, after "printed," insert --the eight bits of ASCII code which describe--.

Signed and Sealed this

Twelfth Day of April, 1988

Attest:

DONALD J. QUIGG

Attesting Officer

Commissioner of Patents and Trademarks